April 29, 1952  E. F. GUSTISHA  2,594,643
VEHICLE TRUNK LID CONTROL
Filed June 16, 1950
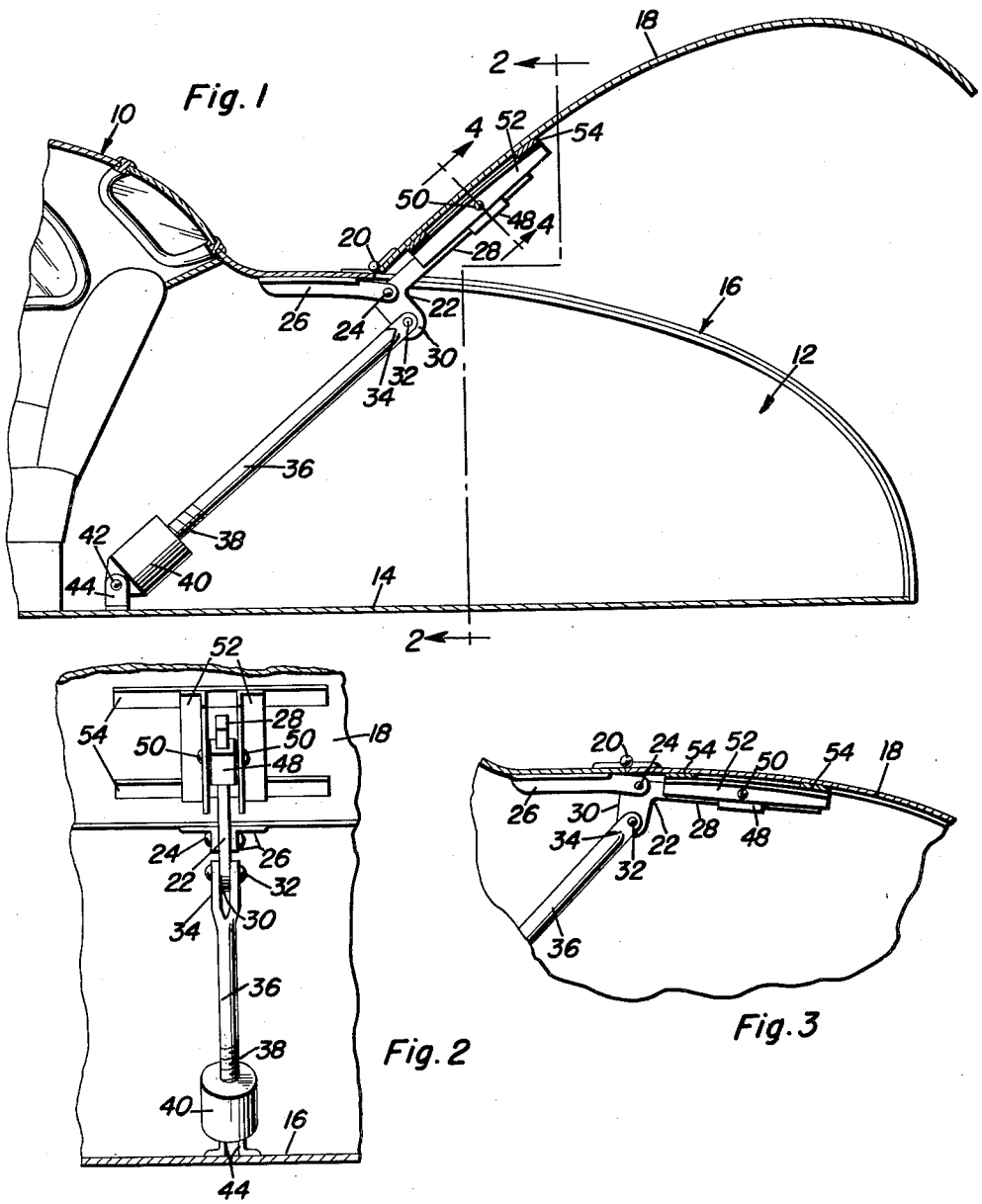
Edward F. Gustisha
INVENTOR.
BY 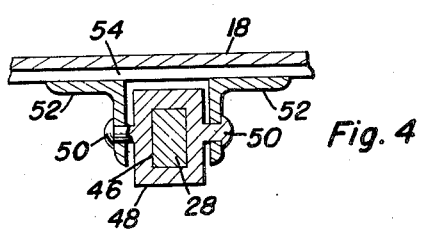
Attorneys

Patented Apr. 29, 1952

2,594,643

UNITED STATES PATENT OFFICE 2,594,643

VEHICLE TRUNK LID CONTROL

Edward F. Gustisha, Waukegan, Ill.

Application June 16, 1950, Serial No. 168,406

1 Claim. (Cl. 268—74)

This invention relates to new and useful improvements and structural refinements in door or lid opening and closing devices, and the principal object of the invention is to facilitate convenient and expeditious opening and closing of a trunk lid or door on automobiles or similar vehicles.

This object is achieved by the provision of linkage operatively connected to the trunk lid and actuated by a reversible electric motor, this arrangement being such that the use of conventional trunk lid handles and locks is eliminated.

Some of the advantages of the invention reside in its simplicity of construction, in its dependable operation, and in its adaptability for use in vehicles of different types.

With the above more important objects and features in view, and such other objects and features as may become apparent as this specification proceeds, the invention consists essentially of the arrangement and construction of parts as illustrated in the accompanying drawings, in which:

Figure 1 is a fragmentary longitudinal sectional view of a vehicle showing the invention in situ therein;

Figure 2 is a fragmentary sectional view, taken substantially in the plane of the line 2—2 in Figure 1;

Figure 3 is a fragmentary sectional view, similar to that shown in Figure 1, but illustrating the trunk lid in its closed position, and Figure 4 is a fragmentary sectional detail, taken substantially in the plane of the line 4—4 in Figure 1.

Like characters of reference are employed to designate like parts in the specification and throughout the several views.

Referring now to the accompanying drawings in detail, the general reference character 10 designates an automotive vehicle having a body provided with a trunk compartment 12 including a floor 14 and a door or lid opening 16, while the door or lid itself is shown at 18 and is connected to the body of the vehicle by suitable hinges 20 for upward and downward swinging movement.

The invention resides in the provision of a control for opening and closing the lid 18, this control embodying in its construction a bell crank 22 which is pivoted at 24 to a suitable bracket 26 secured to the inner wall of the trunk compartment 12 adjacent the hinges 20, one arm 28 of this bell crank being relatively long while the second arm 30 thereof is relatively short.

The relatively short arm 30 of the bell crank 20 is pivoted as at 32 to a fork 34 provided at one end of a non-rotatable but axially shiftable shaft 36, the remaining end portion of which is screw threaded as at 38 and operatively engages a conventional, reversible electric motor 40 such as is commonly used in automobiles for raising and lowering convertible tops. The motor 40 is pivoted as at 42 to suitable brackets 44 secured to the trunk floor 14, and it will be apparent that when the motor is rotated so as to draw the shaft 36 therein, the bell crank 22 will be swung downwardly, and vice versa.

The relatively long arm 28 of the bell crank 22 is slidable in an open ended bore 46 provided in a block 48 which is pivotally mounted by suitable pins 50 between a pair of spaced parallel angle bars 52, and the latter are secured to a plurality of transverse straps 54, which, in turn, are rigidly secured to the inner surface of the trunk lid or door 18.

It will be apparent from the foregoing that when the motor 40 is actuated so as to swing the bell crank 22 upwardly, the trunk lid 18 will be swung to its open position, while swinging of the bell crank 22 downwardly will close the lid. Inasmuch as the pivots 24 and 50 are fixed to the vehicle body and to the trunk lid respectively, the slidability of the long arm 28 in the block 48 will compensate for any variation in distance between the pivots while the lid is being opened or closed.

It is believed that the advantages in use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a vehicle having a trunk compartment and a hinged lid thereon, a lid control comprising a bracket mounted in said compartment adjacent the hinged edge of said lid, a pivot pin provided on said bracket, a bell crank mounted on said pin and including a relatively long arm and a relatively short arm, means operatively connecting said long arm to the inner surface of said lid, a reversible electric motor pivotally mounted in said compartment, and a non-rotatable but axially shiftable shaft having a screw-threaded end portion in operative engagement with said motor, the remaining end of said shaft being pivoted to said short arm whereby said lid may be opened and closed by actuation of said motor, said means for connecting said long arm to said lid comprising a pair of spaced parallel bars secured to the inner surface of the lid, and a block pivotally mounted between said bars and provided with an open-ended bore, said long arm being slidable in the bore of said block.

EDWARD F. GUSTISHA.

REFERENCES CITED

The following references are of record in the file of this patent:

UNITED STATES PATENTS

| Number | Name | Date |
|---|---|---|
| 270,340 | Rose | Jan. 9, 1883 |
| 933,070 | Gleason | Sept. 7, 1909 |
| 1,065,734 | Schwartz et al. | June 24, 1913 |
| 1,491,005 | Fausek et al. | Apr. 22, 1924 |
| 1,674,662 | Rowntree | June 26, 1928 |
| 1,955,088 | Pine et al. | Apr. 17, 1934 |
| 2,034,415 | Parvin | Mar. 17, 1936 |
| 2,371,336 | Levon | Mar. 13, 1945 |
| 2,397,754 | Sawyer | Apr. 2, 1946 |
| 2,535,600 | Rappl | Dec. 26, 1950 |